United States Patent
Asai

(10) Patent No.: US 9,311,030 B2
(45) Date of Patent: Apr. 12, 2016

(54) COMMUNICATION SETTING TECHNOLOGY AND COMMUNICATION APPARATUS

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/797,745

(22) Filed: Jul. 13, 2015

(65) Prior Publication Data

US 2015/0324156 A1    Nov. 12, 2015

Related U.S. Application Data

(63) Continuation of application No. 14/217,895, filed on Mar. 18, 2014.

(30) Foreign Application Priority Data

Mar. 28, 2013 (JP) ................ 2013-070378

(51) Int. Cl.
| | | |
|---|---|---|
| *G06F 3/12* | (2006.01) | |
| *H04W 40/24* | (2009.01) | |
| *H04W 8/02* | (2009.01) | |

(Continued)

(52) U.S. Cl.
CPC ............ *G06F 3/1236* (2013.01); *G06F 3/1204* (2013.01); *G06F 3/1292* (2013.01); *G06F 21/35* (2013.01); *G06F 21/43* (2013.01);
(Continued)

(58) Field of Classification Search
None
See application file for complete search history.

(56) References Cited

U.S. PATENT DOCUMENTS

| | | |
|---|---|---|
| 7,522,049 B2 | 4/2009 | Aljadeff et al. |
| 8,112,036 B2 | 2/2012 | Matsuo et al. |

(Continued)

FOREIGN PATENT DOCUMENTS

| | | |
|---|---|---|
| JP | 2006-163791 A | 6/2006 |
| JP | 2006-311077 A | 11/2006 |

(Continued)

OTHER PUBLICATIONS

Office Action issued in corresponding U.S. Appl. No. 13/846,964 mailed Jan. 2, 2014.

(Continued)

*Primary Examiner* — Martin Mushambo
(74) *Attorney, Agent, or Firm* — Banner & Witcoff, Ltd.

(57) ABSTRACT

A non-transitory computer-readable medium having a communication program stored thereon and readable by a controller of a communication apparatus, the communication program, when executed by the controller, causes the controller to perform: determining whether a wireless setting for performing wireless communication by the wireless communication method is set in an external apparatus when the communication apparatus is in communication with the external apparatus through the first communication unit; determining whether a wireless setting which is settable by the communication apparatus is stored in a storage; and transmitting the wireless setting stored in the storage to the external apparatus through the first communication unit when it is determined that the wireless setting is not set in the external apparatus and it is determined that the wireless setting that is settable by the communication apparatus is stored in the storage.

15 Claims, 3 Drawing Sheets

(51) Int. Cl.
*H04W 4/00* (2009.01)
*H04W 12/06* (2009.01)
*G06F 21/35* (2013.01)
*G06F 21/43* (2013.01)

(52) U.S. Cl.
CPC .............. *H04W 4/008* (2013.01); *H04W 8/02* (2013.01); *H04W 12/06* (2013.01); *H04W 40/24* (2013.01)

(56) References Cited

U.S. PATENT DOCUMENTS

| | | |
|---|---|---|
| 8,134,986 B2 | 3/2012 | Sakai |
| 2005/0207381 A1 | 9/2005 | Aljadeff et al. |
| 2006/0120313 A1* | 6/2006 | Moritomo ......... H04W 52/0225 370/311 |
| 2006/0246946 A1* | 11/2006 | Moritomo ............. H04L 63/162 455/557 |
| 2007/0121541 A1 | 5/2007 | Matsuo |
| 2008/0299909 A1 | 12/2008 | Sakai |
| 2009/0034731 A1* | 2/2009 | Oshima ................. G06F 21/608 380/270 |
| 2009/0253374 A1 | 10/2009 | Matsuo et al. |
| 2009/0256672 A1 | 10/2009 | Yamamoto et al. |
| 2010/0181383 A1 | 7/2010 | Ohashi et al. |
| 2011/0001769 A1 | 1/2011 | Nagai |
| 2011/0063663 A1 | 3/2011 | Kim et al. |
| 2013/0014232 A1* | 1/2013 | Louboutin ........ H04M 1/72527 726/5 |
| 2013/0141747 A1 | 6/2013 | Oba et al. |
| 2013/0225083 A1 | 8/2013 | Matsuo et al. |
| 2013/0250357 A1 | 9/2013 | Yu |

FOREIGN PATENT DOCUMENTS

| | | |
|---|---|---|
| JP | 2007-088726 A | 4/2007 |
| JP | 2007-150984 A | 6/2007 |
| JP | 2007-151194 A | 6/2007 |
| JP | 2008-271150 A | 11/2008 |
| JP | 2008-301214 A | 12/2008 |
| WO | 2013/006315 A1 | 1/2013 |

OTHER PUBLICATIONS

Co-Pending U.S. Appl. No. 14/217,647, filed Mar. 18, 2014.
Aug. 14, 2014—(US) Notice of Allowance—U.S. Appl. No. 14/217,647.
Jul. 10, 2014—(US) Final Office Action—U.S. Appl. No. 13/846,964.
Jun. 30, 2015—(JP) Notification of Reasons for Refusal—App 2013-070378, Eng Tran.
Jul. 14, 2015—(JP) Notification of Reason for Refusal—App 2013-070374, Eng Tran.
Sep. 11, 2015—(US)—Non-Final Office Action—U.S. Appl. No. 14/217,895.
Sep. 2, 2015—(US) Final Office Action—U.S. Appl. No. 13/846,964.
Oct. 13, 2015—(JP) Notifce of Reasons for Rejection—App 2012-069806, Eng Tran.

* cited by examiner

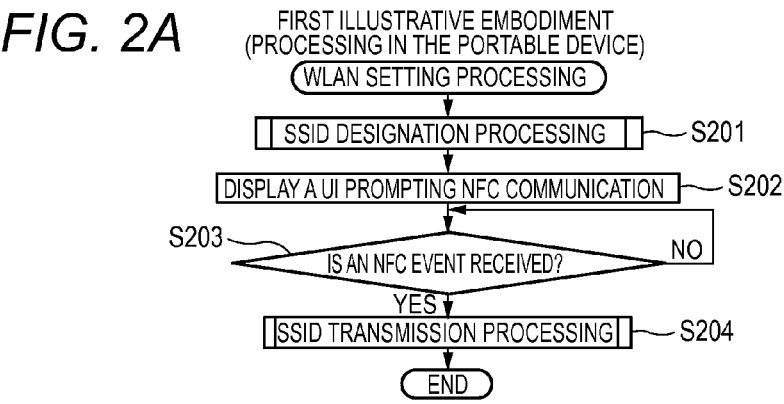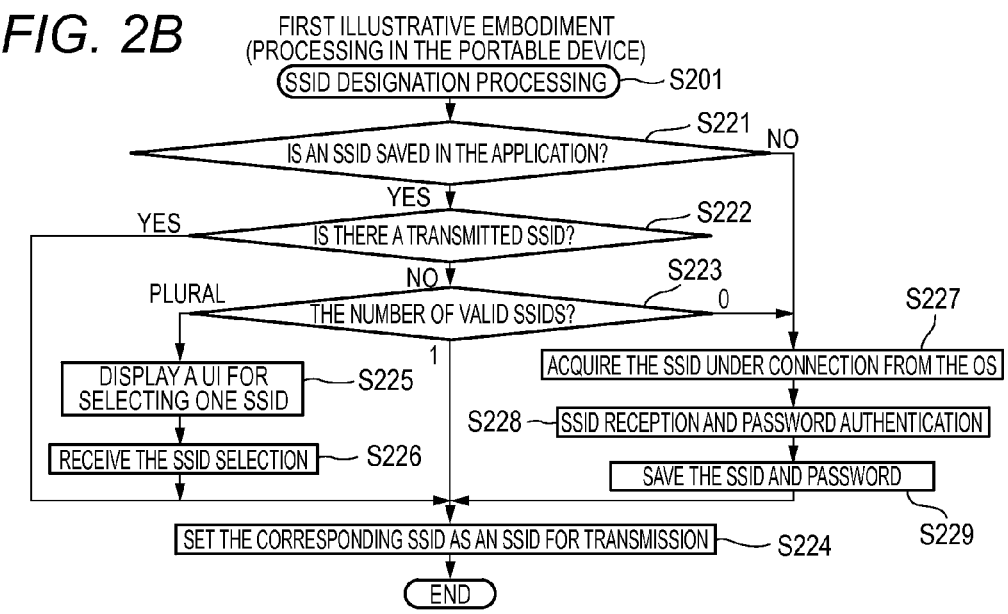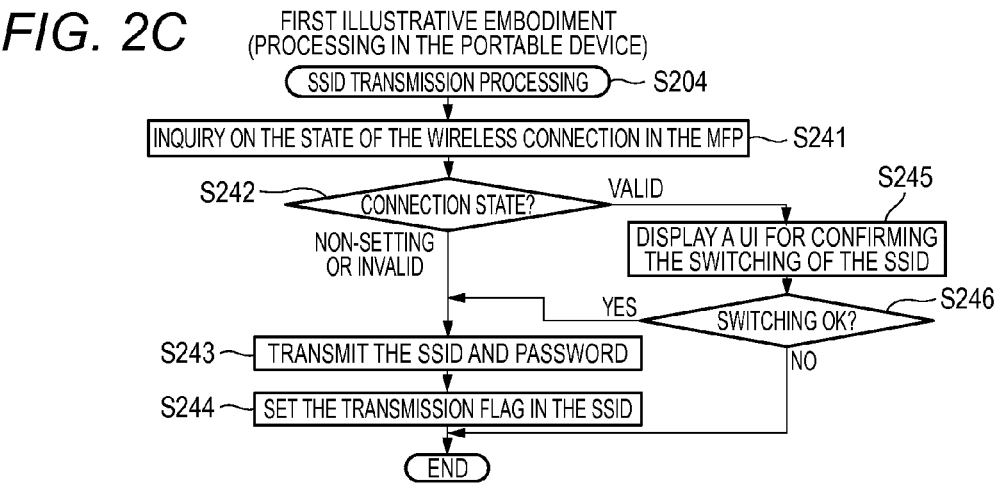

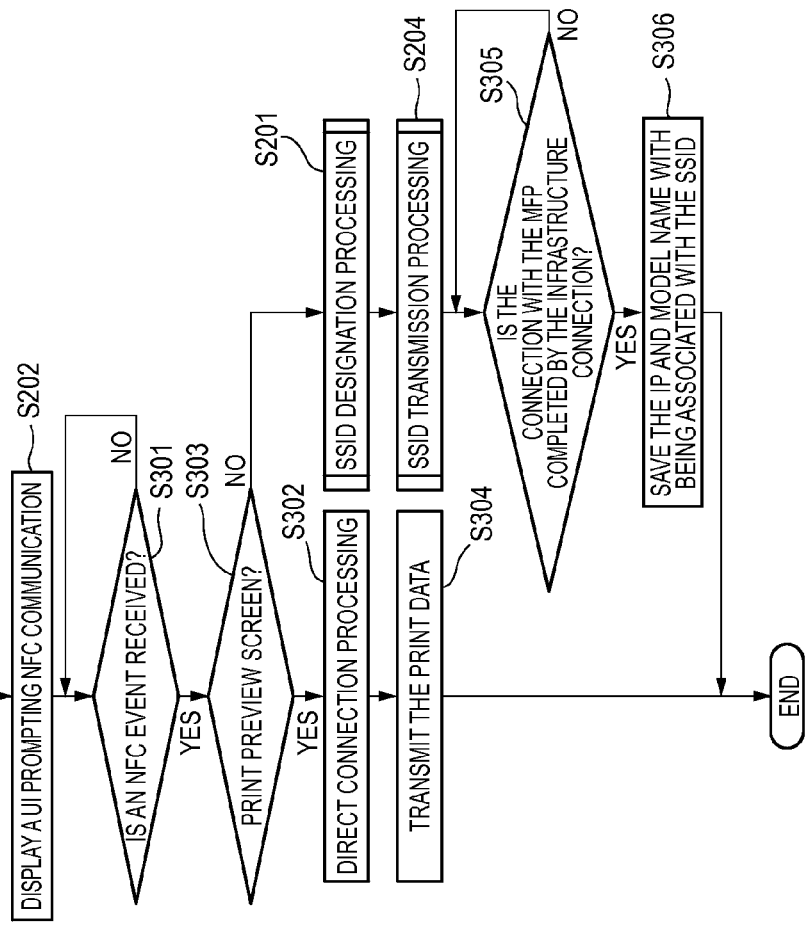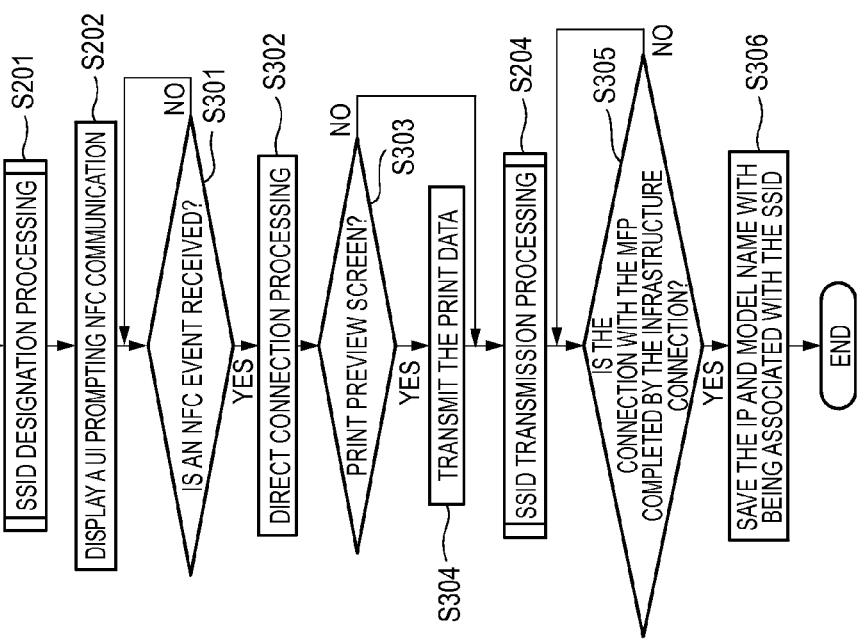

COMMUNICATION SETTING TECHNOLOGY AND COMMUNICATION APPARATUS

CROSS-REFERENCE TO RELATED APPLICATIONS

This application is a continuation of prior U.S. application Ser. No. 14/217,895, filed Mar. 18, 2014, which claims priority from Japanese Patent Application No. 2013-070378 filed on Mar. 28, 2013, the entire subject matter of which is incorporated herein by reference.

TECHNICAL FIELD

The invention relates to a communication program and a communication apparatus.

BACKGROUND

In a printer configured to perform a printing operation for a recording sheet, there has been proposed a technology of transmitting/receiving print data for printing by wireless communication. In this technology, the printer acquires print data from a PC, which is connected to a relay apparatus (for example, an access point) of wireless LAN, by wireless communication through the relay apparatus of the wireless LAN that covers a using place of the printer, and executes a printing operation based on the received print data.

SUMMARY

The printer that acquires the print data from the access point by the wireless communication should be wirelessly connected to the access point so as to transmit/receive data. In order to set a wireless connection between the printer and the access point, it is necessary for a user to input a character string, for example, for the wireless connection from an operation terminal such as a PC connected to the printer. Such an operation for setting the wireless connection is a troublesome for the user.

Therefore, illustrative aspects of the invention provide a communication program and a communication apparatus capable of enabling a wireless setting for performing wireless communication by a wireless communication method that is different from a near field communication method to be easily set in an external apparatus.

According to one illustrative aspect of the invention, there is provided a non-transitory computer-readable medium having a communication program stored thereon and readable by a controller of a communication apparatus, wherein the communication apparatus comprises: a first communication unit configured to perform communication by a near field communication method; a second communication unit configured to perform communication by a wireless communication method that is different from the near field communication method; a storage unit comprising a first storage area that is allotted to the communication program; and the controller, the communication program, when executed by the controller, causes the controller to perform operations comprising: a first determination process of determining whether a wireless setting for performing wireless communication by the wireless communication method is set in an external apparatus in a case where the communication apparatus is in communication with the external apparatus through the first communication unit; a first storage determination process of determining whether a wireless setting, which is settable by the communication apparatus, is stored in the first storage area; and a wireless setting transmission process of transmitting the wireless setting stored in the first storage area to the external apparatus through the first communication unit in a case where the first determination process determines that the wireless setting is not set in the external apparatus and the first storage determination process determines that the wireless setting, which is settable by the communication apparatus, is stored in the first storage area.

Incidentally, the invention can be implemented by a variety of aspects such as a communication apparatus, a control device controlling the communication apparatus, a communication system, a communication method, a communication control program for controlling the communication apparatus, a computer-readable medium having the communication control program stored thereon, and the like.

BRIEF DESCRIPTION OF THE DRAWINGS

FIGS. 2A to 2C are flow charts showing WLAN setting processing, SSID designation processing and SSID transmission processing, respectively; and FIG. 3A is a flow chart showing printing processing of a second illustrative embodiment, and FIG. 3B is a flow chart showing printing processing of a third illustrative embodiment.

DETAILED DESCRIPTION

Figure 1:
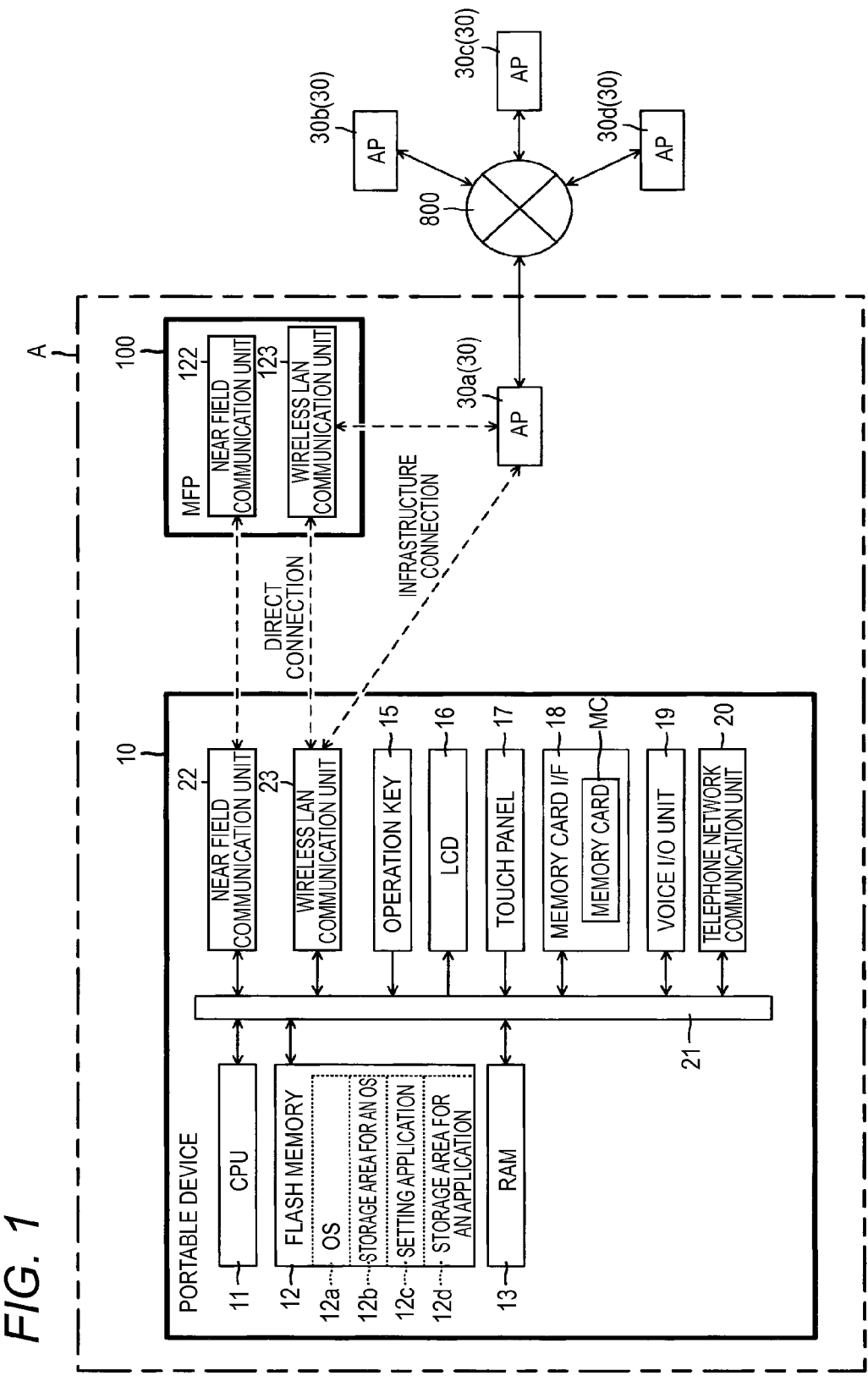
FIG. 1 is a block diagram showing an electrical configuration of a portable device having a setting application mounted therein.

Hereinafter, preferred illustrative embodiments of the invention will be described with reference to the accompanying drawings. First, a first illustrative embodiment will be described with reference to FIGS. 1 and 2. FIG. 1 is a block diagram showing an electrical configuration of a portable device 10 having a setting application 12c mounted therein that is an illustrative embodiment of the communication program of the invention. The portable device 10 is able to perform wireless communication (hereinafter, referred to as 'Wi-Fi communication') based on Wi-Fi (registered trademark) standards with an external apparatus such as a multi-functional peripheral apparatus (hereinafter, referred to as 'MFP') 100. As specifically described later, the portable device 10 having the setting application 12c mounted therein can easily set a wireless setting for performing Wi-Fi communication in the MFP 100 in which the wireless setting for performing Wi-Fi communication is not set.

The portable device 10 of this illustrative embodiment is configured by a portable device such as a smart phone. The portable device 10 is provided with a CPU (which is an abbreviation of "Central Processing Unit") 11, a flash memory 12, a RAM (which is an abbreviation of "Random Access Memory") 13, an operation key 15, an LCD (which is an abbreviation of "Liquid Crystal Display") 16, a touch panel 17, a memory card interface (memory card I/F) 18, a voice I/O (which is an abbreviation of "Input/Output") unit 19, a telephone network communication unit 20, a near field communication unit 22 and a wireless LAN (which is an abbreviation of "Local Area Network") communication unit 23. The respective units are connected to each other by a bus line 24.

The CPU 11 controls the respective units connected to the bus line 24 in response to fixed values or programs stored in the flash memory 12 and the like. The flash memory 12 is a rewritable non-volatile memory. The flash memory 12 stores therein an operating system 12a (hereinafter, referred to as the OS 12a) and the device control application 12c. In the below, the CPU 11 that executes a program such as an application and an operating system may be simply described by a program name. For example, the description of 'application' may mean the 'CPU 11 executing the application'.

The OS 12a is basic software for implementing standard functions of the portable device 10. In this illustrative embodiment, an Android (registered trademark) OS is adopted as the OS 12a. The setting application 12c is an application for setting a wireless setting for performing Wi-Fi communication in the MFP 100 in which the wireless setting for performing Wi-Fi communication is not set. The respective processing shown in flow charts of FIGS. 2A to 2C is executed by the CPU 11 in accordance with the setting application 12c.

The flash memory 12 is provided with a storage area 12b for an OS and a storage area 12d for an application. The storage area 12b for an OS is a storage area that is used by the OS 12a and is allotted to the OS 12a. A variety of setting information set by the OS 12a, for example, an SSID (Service Set Identifier) that is a wireless setting of the Wi-Fi communication, and the like are stored in the storage area 12b for an OS. On the other hand, the storage area 12d for an application is a storage area that is used by the setting application 12c and is allotted to the setting application 12c. The wireless setting of the Wi-Fi communication that is used by the setting application 12c and is settable by the portable device 10, more specifically, an SSID of an access point (AP) 30 that is a relay apparatus is stored in the storage area 12d for an application. The RAM 13 is a rewritable volatile memory having a temporary area for temporarily storing a variety of data when the CPU 11 executes the setting application 12c and the like.

The operation key 15 is a mechanical key for inputting an instruction and the like to the portable device 10 and is provided to a housing of the portable device 10, for example. The LCD 16 is a liquid crystal display apparatus for displaying a variety of screens. The touch panel 17 is provided with overlapping with the LCD 16 and inputs an instruction and the like to the portable device 10 when an indicator such as a finger and a rod is touched or comes close thereto. The memory card I/F 18 is an interface to which a rewritable non-volatile memory card MC is mounted, and controls writing and readout of the data to and from the memory card MC. The voice I/O unit 19 is a device for voice input and output consisting of a microphone, a speaker and the like. The telephone network communication unit 20 is a circuit for communication through a mobile telephone network (not shown).

The near field communication unit 22 is an interface for performing communication by near field communication having a communication-possible distance such as a short distance of about 10 cm. In this illustrative embodiment, the near field communication that is performed by the near field communication unit 22 is non-contact communication (hereinafter, the communication is referred to as 'NFC communication') conforming to NFC standards. In this illustrative embodiment, the portable device 10 is able to perform the NFC communication with the MFP 100 having the near field communication unit 122.

The wireless LAN communication unit 23 is an interface for performing wireless communication by the wireless LAN. In this illustrative embodiment, the communication that is performed by the wireless LAN communication unit 23 is wireless communication by the wireless LAN based on the standards of IEEE 802.11b/g. As described above, the portable device 10 is able to perform the Wi-Fi communication with the MFP 100 having the wireless LAN communication unit 23. Incidentally, a communication-possible distance by the Wi-Fi communication is about 100 m. The wireless LAN communication unit 23 is wirelessly connected to the wireless LAN communication unit 23 of the MFP 100 by any one mode of an infrastructure mode and an ad hoc mode. The infrastructure mode is a mode for wirelessly connecting the portable device 10 (the wireless LAN communication unit 23) and the MFP 100 (a wireless LAN communication unit 123) through the AP 30 that is a relay apparatus. On the other hand, the ad hoc mode is a mode for wirelessly connecting the portable device 10 and the MFP 100 each other without using the AP 30. In the below, the wireless connection by the infrastructure mode is also referred to as 'infrastructure connection' and the wireless connection by the ad hoc mode is also referred to as 'direct connection'.

The MFP 100 has a variety of functions such as printing, scan, copying, facsimile functions and the like. The MFP 100 has a printer unit, a scanner unit, a facsimile communication unit and the like (not shown) for implementing the various functions. The MFP 100 has a near field communication unit 122, like the near field communication unit 22. Also, the MFP 100 has a wireless LAN communication unit 123, like the wireless LAN communication unit 23.

The AP 30 (30a to 30d) is a relay apparatus for relaying the Wi-Fi communication between two apparatuses. The AP 30 is able to connect to a network 800. The AP 30 is able to connect to the other AP 30, a server (not shown) and the like through the network 800. As described above, the communication-possible distance of the Wi-Fi communication has a limit, such as about 100 m. Therefore, for example, as shown in FIG. 1, the portable device 10 and the MFP 100 are able to be infrastructure-connected through the AP 30 in an area A within which they are able to perform communication with the AP 30a by the Wi-Fi communication. On the other hand, the portable device 10 and the MFP 100 located in the area A are unable to be wirelessly connected to the APs 30b to 30d located beyond the area A.

FIG. 2A is a flow chart showing WLAN (Wireless LAN) setting processing. This processing is processing that is executed by the CPU 11 of the portable device 10 in accordance with the setting application 12c and is to set a wireless setting for performing Wi-Fi communication in the MFP 100 in which the wireless setting for performing Wi-Fi communication is not set. This processing starts when the setting application 12c is enabled to start up.

When this processing starts, the CPU 11 executes SSID designation processing (S201). The SSID designation processing (S201) is to designate an SSID that is to be set in the MFP 100 and to set the SSID as an SSID for transmission. The detailed processing thereof will be described later with reference to FIG. 2B. After executing the SSID designation processing (S201), the CPU 11 brings an antenna unit (not shown) of the near field communication unit 22 of the portable device 10 close to an antenna unit (not shown) of the near field communication unit 122 of the MFP 100, thereby displaying a user interface (UI) prompting a user to perform the NFC communication on the LCD 16 (S202).

Then, the CPU 11 waits for reception of an NFC event from the MFP 100 (S203: No). The NFC event is an event that is transmitted from the MFP 100 when the MFP 100 NFC-detects the portable device 10 as the antenna unit of the near field communication unit 22 of the portable device 10 is enabled to come close to the antenna unit of the near field communication unit 122 of the MFP 100. In S203, when the CPU 11 receives an NFC event (S203: Yes), the CPU 11 executes SSID transmission processing (S204) and then ends this processing. The SSID transmission processing (S204) is to control the transmission of the SSID set as the SSID for transmission in the SSID designation processing (S201). The detailed processing thereof will be described later with reference to FIG. 2C.

FIG. 2B is a flow chart showing the SSID designation processing (S201). When the CPU 11 determines that the SSID is stored in the storage area 12d for an application (S221: Yes), the CPU 11 determines whether there is the transmitted SSID in the SSIDs stored in the storage area 12d for an application (S222). In S222, the CPU 11 determines whether the SSID has been transmitted by determining whether a transmission flag is set for the SSID. Specifically, the CPU 11 determines an SSID having a transmission flag set therein as the transmitted SSID and determines that an SSID having the transmission flag cleared is not the transmitted SSID. Incidentally, when storing a new SSID in the storage area 12d for an application, the CPU 11 clears the transmission flag of the SSID. When the SSID is transmitted to the MFP 100 in the SSID transmission processing (S204), which will be described later with reference to FIG. 2C, the CPU 11 sets the transmission flag for the SSID. Incidentally, the set transmission flag may be cleared after predetermined time elapses, for example in 10 minutes. Alternatively, the set transmission flag may be appropriately cleared as the user performs a predetermined operation.

When the CPU 11 determines in S222 that the transmitted SSID is not in the SSIDs stored in the storage area 12d for an application (S222: No), the CPU 11 determines how many the SSIDs of a valid state are in the SSIDs stored in the storage area 12d for an application (S223). Incidentally, the 'SSID of a valid state' indicates an SSID of the AP 30 that can be wirelessly connected at a current position of the portable device 10. On the other hand, an SSID of the AP 30 that cannot be wirelessly connected at a current position of the portable device 10 is an 'SSID of an invalid state', not the valid state.

Specifically, the CPU 11 acquires from the OS 12a an available (active) SSID of the wireless settings of the Wi-Fi communication, i.e., the SSIDs stored in the storage area 12b for an OS. Then, the CPU 11 compares the acquired SSID and the SSIDs stored in the storage area 12d for an application and determines a coinciding SSID as the SSID of a valid state and a non-coinciding SSID as the SSID of an invalid state. In S233, the CPU performs the determination for each of all the SSIDs stored in the storage area 12d for an application and counts the number of the SSIDs determined as the SSID of a valid state.

When the CPU 11 determines in S223 that one SSID of a valid state is in the SSIDs stored in the storage area 12d for an application (S223: 1), the CPU 11 sets the one SSID of a valid state as the SSID for transmission (S224) and then ends this processing.

On the other hand, when the CPU 11 determines in S223 that a plurality of SSIDs of a valid state is in the SSIDs stored in the storage area 12d for an application (S223: multiple), the CPU 11 displays a UI enabling a user to select one of the SSIDs of a valid state on the LCD 16 (S225). By the processing of S225, a list of the SSIDs of a valid state is displayed on the LCD 16, and the user can make an input of selecting one SSID from the list. When the user makes an input of selecting one SSID to the UI displayed by the processing of S225, the CPU 11 receives the selected one SSID (S226). Then, the CPU 11 sets the one SSID selected by the user as the SSID for transmission (S224) and ends this processing.

When the CPU 11 determines in S223 that there is no SSID of a valid state in the SSIDs stored in the storage area 12d for an application (S223: 0) or when the CPU 11 determines in S221 that there is no SSID stored in the storage area 12d for an application (S221: No), the CPU 11 acquires an SSID of the AP 30 under connection from the OS 12a (S227). Specifically, the CPU 11 acquires an SSID of the AP 30 under connection from the SSIDs stored in the storage area 12b for an OS in S227. Incidentally, the description 'under connection' indicates that the infrastructure connection is established between the wireless LAN communication unit 23 and the AP 30. Then, the CPU 11 receives the user selection on one SSID of the AP 30 under connection and performs password authentication for the selected SSID (S228). Specifically, in S228, the CPU 11 first displays the UI enabling the user to select one SSID of the AP 30 under connection acquired from the OS 12a on the LCD 16 and thus prompts the user to select one SSID by operating the UI. Then, the CPU 11 displays a UI for inputting a password for the selected SSID on the LCD 16 and performs the authentication on the basis of the password input to the UI by the user.

Then, the CPU 11 stores (saves) the one SSID authenticated in S228 and the password corresponding to the SSID in the storage area 12d for an application (S229). Thereby, the SSID of the AP 30 under connection, which is not stored in the storage area 12d for an application but stored in the storage area 12b for an OS, is stored in the storage area 12d for an application. Thereby, from next time, it is possible to perform Wi-Fi communication by using the SSID stored in this time or to use the SSID as an SSID to be transmitted to the MFP 100 in which the SSID is not set, without the user manually registering the SSID. After the processing of S229, the CPU 11 sets the SSID, which is acquired from the OS 12a and is password-authenticated, as the SSID for transmission (S224) and ends this processing.

Also, when the CPU 11 determines in S222 that there is the transmitted SSID in the SSIDs stored in the storage area 12d for an application (S222: Yes), the CPU 11 sets the transmitted SSID as the SSID for transmission (S224) and ends this processing. Incidentally, when there is a plurality of the transmitted SSIDs, the CPU displays a UI enabling one SSID to be selected and prompts the user to select one SSID as a transmission target.

FIG. 2C is a flow chart showing the SSID transmission processing (S204). The CPU 11 sends an inquiry to the MFP 100 about a state of the wireless connection through the NFC communication (S241). In response to the inquiry, the MFP 100 checks whether the SSID of the AP 30 is set in the own apparatus and whether the set SSID is valid if the SSID of the AP 30 is set and sends a result of the check back to the portable device 10 through the NFC communication. Incidentally, the 'SSID of a valid state' is indicative of the SSID of the AP 30 that can be wirelessly connected at a current position of the MFP 100, like the portable device 10. On the other hand, the 'SSID of an invalid state' indicates the SSID of the AP 30 that cannot be wirelessly connected at a current position of the MFP 100, like the portable device 10.

The CPU 11 determines a state of the wireless connection of the MFP 100, based on the reply to the inquiry in S241 (S242). When the CPU 11 determines in S242 that the SSID of the AP 30 is not set in the MFP 100 or that the SSID of the AP 30 is set in the MFP 100 but is an SSID of an invalid state (S242: non-setting or invalid), the CPU 11 transmits the SSID set as the SSID for transmission and the password corresponding to the SSID to the MFP 100 through the NFC communication (S243). Then, the CPU 11 sets a transmission flag, which indicates the transmission, for the transmitted SSID (S244) and ends this processing.

On the other hand, when the CPU 11 determines in S242 that the SSID of the AP 30 is set in the MFP 100 and is an SSID of a valid state (S242: valid), the CPU 11 displays a UI, which confirms whether the SSID set in the MFP 100 may be switched, on the LCD 16 (S245). When the CPU 11 receives a user input to the UI, which indicates that the switching of the SSID is permitted (S246: Yes), the CPU 11 proceeds to S243. Therefore, in this case, the SSID set as the SSID for transmission is transmitted to the MFP 100 through the NFC communication. On the other hand, in S246, when the CPU 11 receives a user input indicating that the switching of the SSID is not permitted (S246: No), the CPU 11 ends this processing. Hence, when the user does not permit the switching of the SSID, the SSID set as the SSID for transmission is not transmitted to the MFP 100 and the SSID of a valid state, which is currently set, in kept in the MFP 100, as it is.

According to the first illustrative embodiment, when the SSID is not set in the MFP 100, i.e., when the wireless communication by the Wi-Fi communication is not set, or when the SSID of the AP 30 is set but is an SSID of an invalid state, if the SSID is stored in the storage area 12d for an application, the SSID is transmitted to the MFP 100 by the NFC communication. Hence, the MFP 100 can easily set the wireless setting for performing Wi-Fi communication, i.e., the SSID, compared to a configuration where the user manually inputs and sets the SSID one by one. Also, since the SSID stored in the storage area 12d for an application is a transmission target to the MFP 100, it is possible to set the SSID in the MFP 100 even when the SSID is not set in the OS 12a.

Specifically, the SSID is transmitted to the MFP 100 when the SSID is not in the MFP 100 or when the set SSID is invalid. Hence, it is possible to suppress the SSID of a valid state from being inadvertently rewritten with the SSID transmitted by the portable device 10 even though the SSID of a valid state is set in the MFP 100. On the other hand, when the SSID of a valid state is set in the MFP 100, the portable device 10 asks the user if the SSID set in the MFP 100 may be switched. Then, only when the user permits, the SSID is transmitted to the MFP 100. Therefore, even when the SSID of a valid state is set in the MFP 100, it is possible to change the set SSID in accordance with an intention of the user.

Further, since the SSID, which is transmitted to the MFP 100, of the SSIDs stored in the storage area 12d for an application is limited to the SSID of the AP 30 of a valid state, i.e., to be currently connectable, it is possible to perform Wi-Fi communication between the portable device 10 and the MFP 100 through the AP 30 that can be currently connected. Still further, when a plurality of SSIDs of a valid state is stored in the storage area 12d for an application, the user can select one SSID, which is to be transmitted to the MFP 100, from the multiple SSIDs. Hence, it is possible to transmit an optimal SSID to the MFP 100, depending on the situations.

Further, when the SSID is not stored in the storage area 12d for an application or when all the SSIDs stored in the storage area 12d for an application are the SSIDs of an invalid state, the portable device 10 acquires the SSID of the AP 30 under connection from the OS 12a and transmits the same to the MFP 100. Hence, it is possible to perform Wi-Fi communication between the portable device 10 and the MFP 100 through the AP 30 under connection. Therefore, when the SSID is set in the OS 12a, it is possible to set an SSID in the MFP 100 by using the set SSID.

Further, since the SSID having a transmission flag set thereto of the SSIDs stored in the storage area 12d for an application is to be transmitted to the MFP 100, it is possible to transmit the same SSID to the different MFP 100. Thereby, when it is intended to connect the different MFP 100 to the same SSID, i.e., the same AP 30, it is possible to easily set the wireless setting.

Subsequently, a second illustrative embodiment will be described with reference to FIG. 3A. In the first illustrative embodiment, the setting application 12c is configured as the dedicated application for setting the wireless setting for performing Wi-Fi communication in the MFP 100 in which the wireless setting for performing Wi-Fi communication is not set. On the other hand, the setting application 12c of the second illustrative embodiment is configured to also serve as an application for using the printing function of the MFP 100. In the second illustrative embodiment, the same parts as the first illustrative embodiment are denoted with the same reference numerals and the descriptions thereof are omitted.

FIG. 3A is a flow chart showing printing processing. This processing is processing that is executed by the CPU 11 of the portable device 10 in accordance with the setting application 12c of the second illustrative embodiment, and is to transmit print data to the MFP 100 and to enable the printing function of the MFP 100 to execute the printing based on the print data. This processing starts when the setting application 12c is enabled to start up and the image data is selected as a print target.

When this processing starts, the CPU 11 executes the SSID designation processing (S201) and displays the UI prompting the user to perform the NFC communication on the LCD 16 (S202), like the first illustrative embodiment. Then, the CPU 11 waits for reception of an NFC event from the MFP 100 (S301: No), like the processing of S203. In S301, when the CPU 11 receives an NFC event (S301: Yes), the CPU 11 executes processing for connecting the wireless LAN communication unit 23 and the wireless LAN communication unit 123 of the MFP 100 (S302) by the direct connection. Specifically, in S302, the CPU 11 sets an SSID for direct received together with the NFC event, as the wireless setting for performing Wi-Fi communication through the wireless LAN communication unit 23. Incidentally, the 'SSID for direct' is an SSID that is used when establishing the direct connection with the MFP 100, and is a so-called one time SSID allowing the connection with the wireless LAN communication unit 123 on condition that the SSID is used only one time. In this illustrative embodiment, the MFP 100 issues the SSID for direct to the portable device 10.

The CPU 11 determines whether a screen displayed on the LCD 16 is a print preview screen (S303). When the CPU 11 determines that a print preview screen is displayed on the LCD 16 (S303: Yes), the CPU 11 transmits print data, which includes the image data selected as a print target and the print setting set in the portable device 10, to the MFP 100 (S304) connected by the direct connection. The MFP 100 having received the print data enables a printer unit (not shown) to execute a printing operation based on the received print data. After the processing of S304, the CPU 11 executes the SSID transmission processing (S204), like the first illustrative embodiment. When the SSID transmission processing (S204) is executed, the SSID, which is set as the SSID for transmission in the SSID designation processing (S201), is transmitted to the MFP 100 having no SSID set therein by the NFC communication, like the first illustrative embodiment. On the other hand, when the CPU 11 determines in S303 that a print preview screen is not displayed on the LCD 16 (S303: No), the CPU 11 skips over the processing of S304 and executes the SSID transmission processing (S204).

Then, the CPU 11 determines whether the connection with the MFP 100 by the infrastructure connection is completed (S305). In S305, when the CPU 11 sends an inquiry to the IP address allotted to the MFP 100, which is a destination, through the AP specified by the SSID transmitted to the MFP 100 every predetermined time (for example, every one seconds) and receives a reply to the inquiry, the CPU 11 determines that the connection with the MFP 100 by the infrastructure connection is completed. Incidentally, the IP address allotted to the MFP 100 is received from the MFP 100 through the NFC communication, together with the NFC event. Alternatively, when the SSID received from the portable device 10 is set in the MFP 100, a signal indicating that the infrastructure connection is completed may be transmitted to the IP address allotted to the portable device 10, which is a destination, through the infrastructure-connected AP 30. In this case, the CPU 11 transmits the IP address allotted to the portable device 10 to the MFP 100 through the NFC communication when the antenna unit of the near field communication unit 22 of the portable device 10 is enabled to come close to the antenna unit of the near field communication unit 122 of the MFP 100.

The CPU 11 waits for the completion of the infrastructure connection until the CPU 11 determines that the connection with the MFP 100 by the infrastructure connection is completed (S305: No). On the other hand, when the CPU 11 determines that the connection with the MFP 100 by the infrastructure connection is completed (S305: Yes), the CPU 11 associates and stores the IP address, which is allotted to the MFP 100 with being associated with the SSID transmitted to the MFP 100, and the model name of the MFP 100 in the storage area 12*d* for an application (S306) and ends this processing. Incidentally, the model name of the MFP 100 may be received from the MFP 100 through the NFC communication together with the NFC event, for example, or may be received through the Wi-Fi communication after the connection with the MFP 100 by the infrastructure connection is completed.

According to the second illustrative embodiment, it is possible to enable the MFP 100 to execute the printing operation and to set the SSID in the MFP 100. That is, the setting application 12*c* of the second illustrative embodiment is configured as a printing application having the wireless setting function.

In the below, a third illustrative embodiment will be described with reference to FIG. 3B. In the second illustrative embodiment, the MFP 100 and the AP 30 are infrastructure-connected. In the third illustrative embodiment, the mode of the wireless connection of the MFP 100 is controlled depending on the screen that is displayed on the LCD 16. In the third illustrative embodiment, the same parts as the first or second illustrative embodiment are denoted with the same reference numerals and the descriptions thereof are omitted.

Like the second illustrative embodiment, the printing processing of the third illustrative embodiment also starts when the setting application 12*c* is enabled to start up and the image data is selected as a print target. When this processing starts, the CPU 11 displays the UI prompting the user to perform the NFC communication on the LCD 16 (S202). Then, the CPU 11 waits for reception of an NFC event from the MFP 100 (S301: No). When the CPU 11 receives an NFC event in S301 (S301: Yes) and when the CPU 11 determines that a print preview screen is displayed on the LCD 16 (S303: Yes), the CPU 11 executes processing for connecting the wireless LAN communication unit 23 of the portable device 10 and the wireless LAN communication unit 123 of the MFP 100 by the direct connection (S302) and transmits the print data to the MFP 100 connected by the direct connection (S304). Meanwhile, in this illustrative embodiment, it is assumed that the portable device 10 issues the SSID for direct to the MFP 100. Hence, in this illustrative embodiment, in S302, the CPU 11 issues an SSID for direct and transmits the SSID for direct to the MFP 100 through the NFC communication. When the MFP 100 receives the SSID for direct, the MFP 100 sets the received SSID for direct as the wireless setting for performing Wi-Fi communication with the portable device 10. Thereby, the portable device 10 and the MFP 100 are connected by the direct connection.

On the other hand, when the CPU 11 determines in S303 that a print preview screen is not displayed on the LCD 16 (S303: No), the CPU 11 executes the SSID designation processing (S201) and the SSID transmission processing (S204), like the first illustrative embodiment. Then, the CPU 11 waits for the completion of the connection with the MFP 100 by the infrastructure connection (S305: No). When the CPU 11 determines that the connection with the MFP 100 by the infrastructure connection is completed (S305: Yes), the CPU 11 associates and stores the IP address, which is allotted to the MFP 100 with being associated with the SSID transmitted to the MFP 100, and the model name of the MFP 100 in the storage area 12*d* for an application (S306) and ends this processing.

According to the third illustrative embodiment, when the print preview screen is displayed on the LCD 16, the SSID for direct having a limitation on the number of connection times and securing sufficient security is used irrespective of whether the SSID is set in the MFP 100, and the print data is transmitted by the direct connection, so that it is possible to enable the MFP 100 to execute the printing. Hence, it is possible to rapidly execute the printing conforming to the user's intention having displayed the print preview screen. On the other hand, when the print preview screen is not displayed on the LCD 16, if an SSID is not set in the MFP 100, the SSID (the SSID of the AP 30) set as the SSID for transmission by the SSID designation processing (S201) is transmitted to the MFP 100 through the NFC communication. Hence, when the print preview screen is not displayed, the user can transmit and set the SSID in the MFP 100.

In the respective illustrative embodiments, the setting application 12*c* is an example of the communication program. The portable device 10 is an example of the communication apparatus. The MFP 100 is an example of the external apparatus. The AP 30 is an example of the relay apparatus. The near field communication unit 22 is an example of the first communication unit. The wireless LAN communication unit 23 is an example of the second communication unit. The CPU 11 is an example of the controller. The flash memory 12 is an example of the storage unit. The storage area 12*d* for an application is an example of the first storage area. The storage area 12*b* for an OS is an example of the second storage area. The LCD 16 is an example of the display unit. The OS 12*a* is an example of the program other than the communication program. The SSID of the AP 30 and the SSID for direct are examples of the wireless setting for performing wireless setting by the specific wireless communication method. The SSID for direct is an example of the first wireless setting. The SSID of the AP 30 is an example of the second wireless setting. The UI displayed in S225 is an example of the selection screen. The UI displayed in S245 is an example of the inquiry screen. The print preview screen is an example of the predetermined screen. The CPU 11 that executes the processing of S242 is an example of the first determination process. The CPU 11 that executes the processing of S221 is an example of the first storage determination process. The CPU 11 that executes the processing of S224 and S243 is an example of the wireless setting transmission process. The CPU 11 that executes the processing of S223 is an example of the second determination process. The CPU 11 that executes the processing of S202, S225 and S245 is an example of the display control process. The CPU 11 that executes the processing of S226 is an example of the selection receiving process. The CPU 11 that executes the processing of S229 is an example of the first storage control process. The CPU 11 that executes the processing of S244 is an example of the second storage control process. The CPU 11 that executes the processing of S222 is an example of the second storage determination process. The CPU 11 that executes the processing of S246 is an example of the input receiving process. The CPU 11 that executes the processing of S303 is an example of the third determination process.

Although the invention has been described with reference to the illustrative embodiments, the invention is not limited to the illustrative embodiments and a variety of improvements and modifications can be easily conceived without departing from the gist of the invention.

For example, in the respective illustrative embodiments, the portable device 10 such as a smart phone has been exemplified as the communication apparatus having the device control application 12c mounted therein. However, a variety of apparatuses can be adopted as the communication apparatus insofar as it can perform wireless communication by the NFC communication and the Wi-Fi communication. For example, when an apparatus such as a tablet computer, a note-type PC, a digital camera and a music reproduction apparatus is configured to perform wireless communication by the NFC communication and the Wi-Fi communication, the corresponding apparatus can be adopted as the communication apparatus having the device control application 12c mounted therein. Also, in the respective illustrative embodiments, the OS 12a of the portable device 10 is the Android OS. However, the other OS may be also adopted.

In the second and third illustrative embodiments, the setting application 12c is configured to also serve as the application for using the printing function of the MFP 100. However, the setting application 12c may be configured to also serve as an application for using a function other than the printing function of the MFP 100, for example the scan function. Also, the setting application 12c is not limited to the application for using the function of the MFP 100 and may be configured to also serve as other application, for example, an application for transmitting and receiving data having a relatively small size such as setting data through the NFC communication and then transmitting and receiving data having a relatively large size such as image data through the Wi-Fi communication. Also, in the respective illustrative embodiments, the MFP 100 having the multiple functions such as the printing function has been exemplified as the external apparatus. However, an apparatus specialized to a single function such as a printer and a scanner and a PC having a saving function and the like may be also adopted as the external apparatus.

In the respective illustrative embodiments, the IP address and the model name have been exemplified as the apparatus information for specifying the MFP 100 of the wireless communication destination in the Wi-Fi communication by the infrastructure connection. However, only the IP address may be used. Also, instead of the IP address, a node name, a MAC address and the like may be used as the apparatus information. Incidentally, the timing at which the apparatus information is acquired is not limited to the timing at which the NFC event is received and the apparatus information may be received at appropriate timing. Also, the transmission and reception of the apparatus information is not limited to the NFC communication and may be performed through the Wi-Fi communication when the infrastructure connection is completed after the portable device 10 transmits the SSID to the MFP 100.

In the respective illustrative embodiments, the SSID for direct is the SSID having the condition that it is used only one time. However, the number of using times may not be limited to one time and may be two or more times inasmuch as the security can be secured. Also, the connection limitation of the SSID for direct may be defined by a time element such as elapsed time after the SSID is issued, not by the number of using times such as one time.

In the respective illustrative embodiments, the SSID that is stored in the storage area 12d for an application is limited to the SSID of the AP, i.e., the SSID (hereinafter, referred to as the 'SSID for infrastructure') for infrastructure connection through the AP 30. However, when the portable device 10 and the MFP 100 are connected by the direct connection, the SSID for direct for the direct connection may be stored in the storage area 12d for an application. In this case, the SSID for direct stored in the storage area 12d for an application may be deleted when a predetermined condition such as the number of using times and elapsed time after the SSID is stored is satisfied.

In the respective illustrative embodiments, since the SSID that is stored in the storage area 12d for an application is limited to the SSID for infrastructure, all the SSIDs that are set as the SSID for transmission in the SSID designation processing (S201) are also the SSIDs for infrastructure. That is, in S242 of the SSID transmission processing (S204), when the connection state of the MFP is not set yet or is invalid, the SSID for infrastructure is transmitted to the MFP 100. Instead of this, as described above, in the modified embodiment in which the SSID for direct is stored in the storage area 12d for an application, the SSID for direct stored in the storage area 12d for an application may be set as the SSID for transmission in the SSID designation processing (S201) and then the SSID for direct may be transmitted to the MFP 100 in the SSID transmission processing (S204). Alternatively, in order to connect the portable device 10 and the MFP 100 by the direct connection, the SSID for direct temporarily stored in the temporary area of the RAM 13 may be added to the SSID, which is stored in the storage area 12d for an application, so that it is set as one of the SSIDs to be designated in the SSID designation processing (S201).

In the respective illustrative embodiments, the SSID of the AP of an invalid state, i.e., to be currently non-connectable of the SSIDs stored in the storage area 12d for an application is not transmitted to the MFP 100. However, when there is no SSID of a valid state of the SSIDs stored in the storage area 12d for an application, the SSID of an invalid state may be transmitted to the MFP 100.

In the second illustrative embodiment, the portable device 10 is connected to the MFP 100 by the direct connection by using the SSID for direct received from the MFP 100. However, like the third illustrative embodiment, the portable device 10 may issue an SSID for direct and transmit the issued SSID for direct to the MFP 100, thereby establishing the direct connection. Meanwhile, also in the third illustrative embodiment, the portable device 10 may be connected to the MFP 100 by the direct connection by using the SSID for direct received from the MFP 100, like the second illustrative embodiment.

In the first and second illustrative embodiments, the SSID designation processing (S201) is executed before the NFC communication is performed between the portable device 10 and the MFP 100. However, like the third illustrative embodiment, the SSID designation processing (S201) may be executed after the NFC communication is performed between the portable device 10 and the MFP 100. Meanwhile, also in the third illustrative embodiment, the SSID designation processing (S201) may be executed before the NFC communication is performed between the portable device 10 and the MFP 100. Incidentally, the configuration where the SSID designation processing (S201) is executed before the NFC communication is performed between the portable device 10 and the MFP 100 is more convenient to the user because it is not necessary to bring the portable device 10 close to the MFP 100 so as to perform the NFC communication.

In the respective illustrative embodiments, when there is no transmitted SSID, the processing of S223 is executed. Alternatively, even when there is a transmitted SSID, the processing of S223 may be executed. That is, in the SSID designation processing of FIG. 2B, the processing of S222 may be omitted.

In the respective illustrative embodiments, the CPU 11 executes the respective processing of FIGS. 2 and 3. However, a plurality of CPUs may cooperatively execute the respective processing of FIGS. 2 and 3. Also, a single IC such as ASIC may independently or multiple ICs may cooperatively execute the respective processing of FIGS. 2 and 3. Also, the CPU 11 and the IC such as ASIC may cooperatively execute the respective processing of FIGS. 2 and 3.

The respective features described in the first and third illustrative embodiments and the respective modified embodiments may be appropriately combined.

Illustrative embodiments of the invention can provide at least the following advantages.

(1) According to the above-described non-transitory computer-readable medium, in the case where it is determined that the wireless setting for performing wireless communication by the wireless communication method is not set in the external apparatus and in the case where the wireless setting, which is settable by the communication apparatus mounting the communication program therein, is stored in the first storage area allotted to the communication program, the wireless setting stored in the first storage area is transmitted to the external apparatus through the first communication unit. Hence, the external apparatus can easily set the wireless setting for performing wireless communication by the wireless communication method, compared to a configuration where a user manually inputs and sets the wireless setting one by one. Also, the wireless setting is transmitted to the external apparatus on condition that it is determined that the wireless setting for performing wireless communication by the wireless communication method is not set in the external apparatus. Hence, it is possible to suppress the set wireless setting from being inadvertently rewritten with the wireless setting transmitted by the communication apparatus (i.e., received by the external apparatus) even though the wireless setting for performing wireless communication by the wireless communication method is set in the external apparatus.

(2) In the case where it is determined that the wireless setting, which is settable by the communication apparatus, is stored in the first storage area, the wireless setting of a valid state of the wireless settings stored in the first storage area, which can perform communication with the relay apparatus performing wireless communication with the external apparatus by the wireless communication by the wireless communication method, is transmitted to the external apparatus through the first communication unit. Hence, it is possible to set the wireless setting capable of performing communication with the relay apparatus by the wireless communication of the wireless communication method in the external apparatus.

(3) In the case where there are the multiple wireless settings of a valid state, which can perform communication with the relay apparatus by the wireless communication of the wireless communication method, of the wireless settings stored in the first storage area, the selection screen for selecting a wireless setting, which is to be transmitted to the external apparatus, from the multiple wireless settings of a valid state is displayed on the display unit. Thus, it is possible to set the wireless setting, which is optimal depending on situations, of the wireless settings capable of performing communication with the relay apparatus by the wireless communication of the wireless communication method in the external apparatus.

(4) In the case where the wireless setting stored in the first storage area is not the wireless setting of a valid state capable of performing communication with the relay apparatus, which performs wireless communication with the external apparatus, by the wireless communication of the wireless communication method, the wireless setting, which is stored in the second storage area allotted to the program other than the communication program and is set as the wireless setting for performing wireless communication through the second communication unit, is transmitted to the external apparatus through the first communication unit. Therefore, it is possible to set the wireless setting, which is set in the communication apparatus, in the external apparatus, thereby performing wireless communication by the wireless communication method between the external apparatus and the communication apparatus.

(5) In the case where it is determined that the wireless setting, which is settable by the communication apparatus, is not stored in the first storage area, the wireless setting, which is stored in the second storage area to be used by the program other than the communication program and is set as the wireless setting for performing wireless communication through the second communication unit, is transmitted to the external apparatus through the first communication unit. Thus, it is possible to set the wireless setting, which is set in the communication apparatus, in the external apparatus, thereby performing wireless communication by the wireless communication method between the external apparatus and the communication apparatus.

(6) In the case where the wireless setting, which is stored in the second storage area and is set as the wireless setting for performing wireless communication by the wireless communication method, is transmitted to the external apparatus, the wireless setting is stored in the first storage area. Hence, since it is possible to use the wireless setting, which is used by the program other than the communication program, by the communication program, it is possible to use the wireless setting at any time by the communication program.

(7) In the case where the wireless setting is transmitted to the external apparatus, it is possible to associate the wireless setting with the transmission completion information capable of specifying that the wireless setting has been transmitted. In the case where it is determined that the wireless setting associated with the transmission completion information is stored in the first storage area, the wireless setting associated with the transmission completion information is transmitted to the external apparatus through the first communication unit. Hence, it is possible to set the same wireless setting in the multiple external apparatuses.

(8) In the case where the wireless setting incapable of performing the relay apparatus, which performs wireless communication with the external apparatus, by the wireless communication method is set in the external apparatus, it is determined that the wireless setting is not set in the external apparatus. Hence, in this case, since the wireless setting is transmitted by the wireless setting transmission process, it is possible to set the wireless setting transmitted by the communication apparatus in the external apparatus. At this time, in the case where the wireless setting transmitted by the communication apparatus enables the wireless communication with the relay apparatus by the wireless communication method, it is possible to enable the external apparatus, which cannot perform the relay apparatus by the wireless communication of the wireless communication method, to be at a state where the external apparatus can perform wireless communication with the relay apparatus by the wireless communication of the wireless communication method.

(9) In the case where it is determined that the wireless setting for performing wireless communication by the wireless communication method is set in the external apparatus, the inquiry screen inquiring whether or not to transmit the wireless setting stored in the first storage area to the external apparatus is displayed on the display unit. Then, in the case where the transmission to the external apparatus is selected on the selection screen, the wireless setting stored in the first storage area is transmitted to the external apparatus through the first communication unit. Hence, even when the wireless setting for performing wireless communication by the wireless communication method is set in the external apparatus, it is possible to set the wireless setting stored in the first storage area in the external apparatus in accordance with the user's intention.

(10) In the case where the predetermined screen is displayed on the display unit, it is possible to enable the external apparatus to execute a function corresponding to the predetermined screen displayed on the display unit by using the wireless setting (the first wireless setting) having a limitation on connection time or the number of connection times to thus secure sufficient security and for performing wireless communication with the external apparatus without using the relay apparatus, irrespective of whether the wireless setting is set in the external apparatus. Therefore, it is possible to rapidly execute the function in accordance with the user's intention having displayed the predetermined screen. On the other hand, in the case where the predetermined screen is not displayed on the display unit, if the wireless setting is not set in the external apparatus, the wireless setting (the second wireless setting), which is stored in the first storage area and is settable by the communication apparatus, for performing wireless communication with the relay apparatus capable of performing wireless communication with the external apparatus is transmitted to the external apparatus through the first communication unit. Therefore, in the case where the predetermined screen is not displayed, the user is able to set the second wireless setting, which is stored in the first storage area, in the external apparatus.

(11) According to the above-described communication apparatus, it is possible to obtain the same advantages as the above-described non-transitory computer-readable medium.

The invention claimed is:

1. A non-transitory computer-readable medium having a communication program stored thereon and readable by a controller of a communication apparatus,
wherein the communication apparatus comprises:
a first communication unit configured to perform communication by a near field communication method;
a second communication unit configured to perform communication by a wireless communication method that is different from the near field communication method;
a storage unit storing a wireless setting; and
the controller,
wherein the communication program, when executed by the controller, causes the controller to perform operations comprising:
a first determination process of determining whether a wireless setting for performing wireless communication by the wireless communication method is set in an external apparatus in a case where the communication apparatus is in communication with the external apparatus through the first communication unit; and
a wireless setting transmission process of transmitting the wireless setting stored in the storage unit to the external apparatus through the first communication unit in a case where the first determination process determines that the wireless setting is not set in the external apparatus,
wherein in a case where (a) the wireless setting for performing wireless communication by the wireless communication method is set in the external apparatus and (b) the wireless setting is not a wireless setting of a valid state capable of performing communication with a relay apparatus, which performs wireless communication with the external apparatus, by the wireless communication of the wireless communication method, the first determination process determines that the wireless setting is not set.

2. The non-transitory computer-readable medium according to claim 1,
wherein the storage unit comprises a first storage area that is allotted to the communication program and a second storage area that is allotted to a program other than the communication program,
wherein the operations further comprise:
a first storage determination process of determining whether a wireless setting, which is settable by the communication apparatus, is stored in the first storage area; and
a second determination process of, in the case where the first storage determination process determines that the wireless setting that is settable by the communication apparatus is stored in the first storage area, determining whether the wireless setting stored in the first storage area is the wireless setting of a valid state, and
wherein in a case where the second determination process determines that the wireless setting stored in the first storage area is not the wireless setting of a valid state, the wireless setting transmission process transmits the wireless setting, which is stored in the second storage area and is set as the wireless setting for performing wireless communication by the wireless communication method, to the external apparatus through the first communication unit.

3. The non-transitory computer-readable medium according to claim 1,
wherein the storage unit comprises a first storage area that is allotted to the communication program and a second storage area that is used by a program other than the communication program,
wherein the operations further comprise:
a first storage determination process of determining whether a wireless setting, which is settable by the communication apparatus, is stored in the first storage area, and
wherein in a case where the first storage determination process determines that the wireless setting, which is settable by the communication apparatus, is not stored in the first storage area, the wireless setting transmission process transmits the wireless setting, which is stored in the second storage area and is set as the wireless setting for performing wireless communication by the wireless communication method, to the external apparatus through the first communication unit.

4. The non-transitory computer-readable medium according to claim 1,
wherein the operations further comprise:
a second storage control process of, in a case where the wireless setting is transmitted to the external apparatus by the wireless setting transmission process, associating and storing the wireless setting and transmission completion information capable of specifying that the wireless setting has been transmitted; and
a second storage determination process of determining whether the wireless setting associated with the transmission completion information is stored in the storage unit, and
wherein in a case where the second storage determination process determines that the wireless setting associated with the transmission completion information is stored in the storage unit, the wireless setting transmission process transmits the wireless setting associated with the transmission completion information to the external apparatus through the first communication unit.

5. The non-transitory computer-readable medium according to claim 1,
wherein the communication apparatus comprises a display unit,
wherein the operations further comprise:
a display control process of displaying a screen on the display unit,
wherein in a case where the first determination process determines that the wireless setting is set in the external apparatus, the display control process displays, on the display unit, an inquiry screen inquiring whether or not to transmit the wireless setting stored in the storage unit to the external apparatus,
wherein the operations further comprise:
an input receiving process of receiving an input to the inquiry screen displayed on the display unit, and
wherein in a case where an input received by the input receiving process indicates that the wireless setting stored in the storage unit is to be transmitted to the external apparatus, the wireless setting transmission process transmits the wireless setting stored in the storage unit to the external apparatus through the first communication unit.

6. The non-transitory computer-readable medium according to claim 1,
wherein the communication apparatus comprises a display unit,
wherein the wireless setting comprises:
a first wireless setting having a limitation on connection time or a number of connection times and for performing wireless communication with the external apparatus without using a relay apparatus; and
a second wireless setting for performing wireless communication with a relay apparatus configured to perform wireless communication with the external apparatus,
wherein the operations further comprise:
a function execution process of performing communication corresponding to a predetermined function, which is executable by the external apparatus, with the external apparatus by the wireless communication through the second communication unit so as to execute the predetermined function; and
a second determination process of determining whether a predetermined screen of screens relating to the predetermined function, which is executable by the external apparatus, is displayed on the display unit,
wherein on condition that the second determination process determines that the predetermined screen is displayed on the display unit, the function execution process performs communication with the external apparatus by using the first wireless setting and through the second communication unit, in accordance with a function corresponding to the predetermined screen, and
wherein on condition that the second determination process determines that the predetermined screen is not displayed on the display unit, in a case where the first determination process determines that the wireless setting is not set in the external apparatus, the wireless setting transmission process transmits the second wireless setting stored in the storage unit to the external apparatus through the first communication unit.

7. The non-transitory computer-readable medium according to claim 1,
wherein the operations further comprise:
a second determination process of determining whether the wireless setting stored in the storage unit is a wireless setting of a valid state capable of performing communication with a relay apparatus, which performs wireless communication with the external apparatus, by the wireless communication of the wireless communication method, and
wherein the wireless setting transmission process transmits the wireless setting stored in the storage unit, which is determined as the wireless setting of a valid state by the second determination process, to the external apparatus through the first communication unit.

8. The non-transitory computer-readable medium according to claim 7,
wherein the communication apparatus comprises a display unit,
wherein the operations further comprise:
a display control process of displaying a screen on the display unit,
wherein in a case where there is a plurality of wireless settings stored in the storage unit, which are determined as the wireless setting of a valid state by the second determination process, the display control process displays on the display unit a selection screen for enabling a wireless setting, which is to be transmitted to the external apparatus, to be selected from the wireless settings of a valid state,
wherein the operations further comprise:
a selection receiving process of receiving a selection of the wireless setting, which is to be transmitted to the external apparatus, made on the selection screen displayed on the display unit, and
wherein the wireless setting transmission process transmits the wireless setting, the selection of which is received by the selection receiving process, to the external apparatus through the first communication unit.

9. The non-transitory computer-readable medium according to claim 7,
wherein the storage unit comprises a first storage area that is allotted to the communication program and a second storage area that is allotted to a program other than the communication program,
wherein the operations further comprise a first storage determination process of determining whether a wireless setting, which is settable by the communication apparatus, is stored in the first storage area, wherein the second determination process comprises, in the case where the first storage determination process determines that the wireless setting that is settable by the communication apparatus is stored in the first storage area, determining whether the wireless setting stored in the first storage area is a wireless setting of a valid state capable of performing communication with a relay apparatus, which performs wireless communication with the external apparatus, by the wireless communication of the wireless communication method, and wherein in a case where the second determination process determines that the wireless setting stored in the first storage area is not the wireless setting of a valid state, the wireless setting transmission process transmits the wireless setting, which is stored in the second storage area and is set as the wireless setting for performing wireless communication by the wireless communication method, to the external apparatus through the first communication unit.

10. The non-transitory computer-readable medium according to claim 7, wherein the storage unit comprises a first storage area that is allotted to the communication program and a second storage area that is used by a program other than the communication program, wherein the operations further comprise a first storage determination process of determining whether a wireless setting, which is settable by the communication apparatus, is stored in the first storage area, and wherein in a case where the first storage determination process determines that the wireless setting, which is settable by the communication apparatus, is not stored in the first storage area, the wireless setting transmission process transmits the wireless setting, which is stored in the second storage area and is set as the wireless setting for performing wireless communication by the wireless communication method, to the external apparatus through the first communication unit.

11. The non-transitory computer-readable medium according to claim 9, wherein the operations further comprise:

a first storage control process of storing the wireless setting transmitted to the external apparatus by the wireless setting transmission process, which is stored in the second storage area and is set as the wireless setting for performing wireless communication by the wireless communication method, in the first storage area.

12. The non-transitory computer-readable medium according to claim 11, wherein the operations further comprise:

a first storage control process of storing the wireless setting transmitted to the external apparatus by the wireless setting transmission process, which is stored in the second storage area and is set as the wireless setting for performing wireless communication by the wireless communication method, in the first storage area.

13. The non-transitory computer-readable medium according to claim 7, wherein the operations further comprise:

a storage control process of, in a case where the wireless setting is transmitted to the external apparatus by the wireless setting transmission process, associating and storing the wireless setting and transmission completion information capable of specifying that the wireless setting has been transmitted; and a storage determination process of determining whether the wireless setting associated with the transmission completion information is stored in the storage unit, and wherein in a case where the storage determination process determines that the wireless setting associated with the transmission completion information is stored in the storage unit, the wireless setting transmission process transmits the wireless setting associated with the transmission completion information to the external apparatus through the first communication unit.

14. A non-transitory computer-readable medium having a communication program stored thereon and readable by a controller of a communication apparatus, wherein the communication apparatus comprises:

a first communication unit configured to perform communication by a near field communication method;

a second communication unit configured to perform communication by a wireless communication method that is different from the near field communication method;

a storage unit storing a wireless setting;

a display unit; and the controller, wherein the communication program, when executed by the controller, causes the controller to perform operations comprising:

a first determination process of determining whether a wireless setting for performing wireless communication by the wireless communication method is set in an external apparatus in a case where the communication apparatus is in communication with the external apparatus through the first communication unit;

a wireless setting transmission process of transmitting the wireless setting stored in the storage unit to the external apparatus through the first communication unit in a case where the first determination process determines that the wireless setting is not set in the external apparatus; and a display control process of displaying a screen on the display unit, wherein in a case where the first determination process determines that the wireless setting is set in the external apparatus, the display control process displays, on the display unit, an inquiry screen inquiring whether or not to transmit the wireless setting stored in the storage unit to the external apparatus, wherein the operations further comprise:

an input receiving process of receiving an input to the inquiry screen displayed on the display unit, and wherein in a case where an input received by the input receiving process indicates that the wireless setting stored in the storage unit is to be transmitted to the external apparatus, the wireless setting transmission process transmits the wireless setting stored in the storage unit to the external apparatus through the first communication unit.

15. A non-transitory computer-readable medium having a communication program stored thereon and readable by a controller of a communication apparatus, wherein the communication apparatus comprises:

a first communication unit configured to perform communication by a near field communication method;

a second communication unit configured to perform communication by a wireless communication method that is different from the near field communication method;

a storage unit storing a wireless setting;
a display unit; and
the controller,
wherein the communication program, when executed by the controller, causes the controller to perform operations comprising:
a first determination process of determining whether a wireless setting for performing wireless communication by the wireless communication method is set in an external apparatus in a case where the communication apparatus is in communication with the external apparatus through the first communication unit; and
a wireless setting transmission process of transmitting the wireless setting stored in the storage unit to the external apparatus through the first communication unit in a case where the first determination process determines that the wireless setting is not set in the external apparatus,
wherein the wireless setting comprises:
a first wireless setting having a limitation on connection time or a number of connection times and for performing wireless communication with the external apparatus without using a relay apparatus; and
a second wireless setting for performing wireless communication with a relay apparatus configured to perform wireless communication with the external apparatus,
wherein the operations further comprise:
a function execution process of performing communication corresponding to a predetermined function, which is executable by the external apparatus, with the external apparatus by the wireless communication through the second communication unit so as to execute the predetermined function; and
a second determination process of determining whether a predetermined screen of screens relating to the predetermined function, which is executable by the external apparatus, is displayed on the display unit,
wherein on condition that the second determination process determines that the predetermined screen is displayed on the display unit, the function execution process performs communication with the external apparatus by using the first wireless setting and through the second communication unit, in accordance with a function corresponding to the predetermined screen, and
wherein on condition that the second determination process determines that the predetermined screen is not displayed on the display unit, in a case where the first determination process determines that the wireless setting is not set in the external apparatus, the wireless setting transmission process transmits the second wireless setting stored in the storage unit to the external apparatus through the first communication unit.

* * * * *